July 7, 1925.  1,545,257
E. HOPKINSON ET AL
PROCESS FOR MAKING ARTICLES OF VARIOUS SHAPES DIRECTLY FROM SOLUTIONS
OR SUSPENSIONS OF RUBBER, AND TO THE ARTICLES SO OBTAINED
Filed April 17, 1923  4 Sheets-Sheet 1

Inventors.
ERNEST HOPKINSON AND
WILLIS A. GIBBONS,

Attorney.

July 7, 1925.   1,545,257
E. HOPKINSON ET AL
PROCESS FOR MAKING ARTICLES OF VARIOUS SHAPES DIRECTLY FROM SOLUTIONS
OR SUSPENSIONS OF RUBBER, AND TO THE ARTICLES SO OBTAINED
Filed April 17, 1923    4 Sheets-Sheet 3

Inventors.
ERNEST HOPKINSON AND
WILLIS A. GIBBONS,

Attorney.

Patented July 7, 1925.

1,545,257

UNITED STATES PATENT OFFICE.

ERNEST HOPKINSON, OF NEW YORK, AND WILLIS A. GIBBONS, OF LITTLE NECK, NEW YORK, ASSIGNORS TO REVERE RUBBER COMPANY, OF CHELSEA, MASSACHUSETTS, A CORPORATION OF RHODE ISLAND.

PROCESS FOR MAKING ARTICLES OF VARIOUS SHAPES DIRECTLY FROM SOLUTIONS OR SUSPENSIONS OF RUBBER, AND TO THE ARTICLES SO OBTAINED.

Application filed April 17, 1923. Serial No. 632,609.

*To all whom it may concern:*

Be it known that we, ERNEST HOPKINSON and WILLIS A. GIBBONS, both citizens of the United States, and residents of New York, county and State of New York, and Little Neck, Long Island, county of Queens, and State of New York, respectively, have invented certain new and useful Improvements in processes for making articles of various shapes directly from solutions or suspensions of rubber, and to the articles so obtained, of which the following is a full, clear, and exact description.

This invention relates to making articles of various shapes directly from solutions or suspensions of rubber, particularly the making of thread, tubing, strips and other articles by extruding latex and recovering its solid constituents in the desired form; and to the article so obtained and the apparatus employed in such manufacture.

Rubber thread appears on the market only in rectangular cross section (usually square) and is ordinarily made by preparing a suitable rubber compound which is calendered to a desired thickness, vulcanized under the pressure of tightly wound sheets, and cut to form a thread of rectangular cross-section.

Ordinary rectangular rubber thread ages poorly at its sharp corners and when the edges thus begin to deteriorate and lose their stretch the thread being under uneven strain when stretched will break more easily. It has also been observed that where the thread is wrapt between tight fabric surfaces roughening of the thread by the rough fabric surfaces accelerates deterioration. It has also been found that, particularly on damp days there is a tendency for thread of rectangular cross section to fray in passing through the machinery used for weaving and this frayed thread catches on the fibres of the textile fabrics and causes irregularities and other serious defects in the woven material.

Rubber tubes have been made by extruding crude rubber compounded as desired, the freshly formed tube being embedded in talc and vulcanized. Sheets of rubber such as rubber dams are usually made by calendering crude rubber compounded or not as desired and vulcanizing it with sulphur monochloride or else a block of vulcanized crude rubber is prepared and cut into sheets to form so-called "cut sheets".

The manufacture of thread as well as that of tubing and strips or sheets of rubber as heretofore practiced employs rubber which has been obtained from latex by numerous intermediate steps including coagulation, washing, drying. In these prior processes also compounding ingredients including those for vulcanization have been mixed with the rubber by milling or similar operation resulting in an increased cost of the product and usually the weakening of the product through the milling practised.

The objects of the present invention accordingly are to do away with the disadvantages of processes heretofore employed for making thread, tubing, strips, sheets and similar articles from rubber and to provide a simple and inexpensive process for their production; to provide a series of articles having improved physical properties, and particularly in the case of thread to produce an article having an improved shape, not apt to age rapidly nor to fray during the weaving operation; and to produce a simple, efficient, apparatus for carrying out the process and the production of such articles.

The invention accordingly includes a process of making thread, tubing and similar articles which comprises, forming from a stream of rubber latex a solid rubber mass continuous with the stream, and recovering the rubber mass.

It also includes means to provide a stream of latex including an orifice and means for changing the stream of latex into a solid rubber mass of approximately the contour of the orifice. It also includes articles such as rubber thread, tubing and sheets of rubber formed directly from latex by extrusion.

A preferred form of apparatus by which the invention may be carried out is shown in the accompanying drawings in which.

Referring now more specifically to the drawings, upon a framework 1 supported in superposed relation is a series of troughs 2, 3, 4, 5, 6, 7, a drying conveyor 8, troughs 9, 10, and 10ª, drying conveyors 11, 12 and 13, troughs 14, 15 and 16, and a drying conveyor 17. The frame and troughs are housed in a suitably ventilated housing 18. Preferably outside the housing is a tank 19 for the latex or similar material. The latex is preferably forced from this tank by air pressure, controlled through a regulator 20, comprising an entrance pipe 21 passing below the surface of the water or other liquid having a pressure opposing that of the air which pressure is regulated by moving the pipe 21 up and down to cause less and greater water pressure respectively to be exerted on the incoming air.

Figures 2, 3, 4, 5:
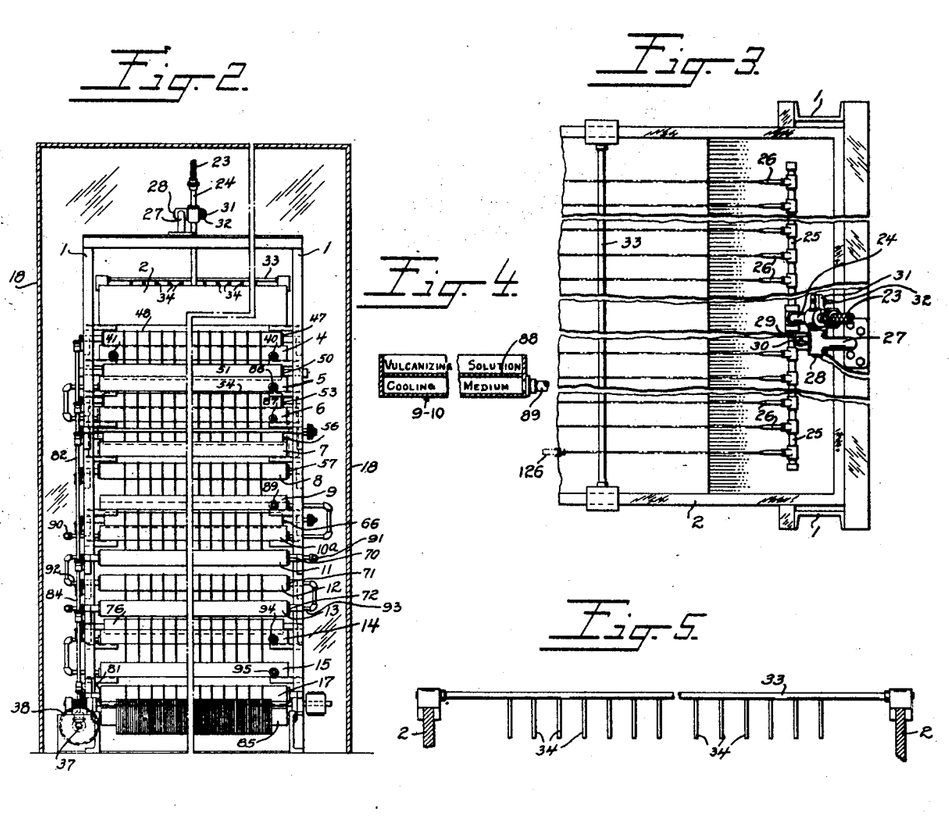
Fig. 2 is an end elevation viewed from the right with the right end of the housing removed.
Fig. 3 is a fragmentary plan view of the uppermost trough of the apparatus showing means for adjusting nozzles with respect to the surface of the liquid (as employed in the preferred embodiment of the process) in the trough.
Fig. 4 is a fragmentary detail view showing the water jacket employed for tanks 9 and 10.
Fig. 5 is a detail elevation of a separator device for keeping threads or other articles emerging from the nozzle separate.

The latex passes from the tank 19 through a pipe controlled by valve 22 through a flexible hose 23 through an adjustable pipe 24 to a feed pipe 25 which communicates with and upon which are mounted a series of nozzles 26. These and the adjoining piping may be of metal, glass or other material. The pipe 24, see Figs. 2 and 3, is supported by a bracket 27 mounted on the end of the trough 2 by a stud 28 which passes through jaws 29 which may be held fast by a wing nut 30. By this arrangement the upright pipe 24 may be moved in a circle about the stud 28. The stud 28 is connected with jaws 31 controlled by a wing nut 32 and the upright pipe passes through jaws 31 and may be adjusted longitudinally of itself and fixed in position by means of the nut 32. By the arrangement just described it will be observed that the depth of the nozzles with respect to the surface of a liquid contained in the tank 2 may be adjusted and the angle made by the plane passing through the longitudinal axes of the nozzles with the surface of the liquid may also be varied as desired.

Trough 2 contains preferably a coagulant such as an aqueous acetic acid solution containing 10–25% acetic acid. Spaced at intervals along the length of the trough 2 are separator devices shown more clearly in Fig. 5 each of which comprises a cross rod 33 having depending therefrom a series of spaced fingers 34. At the end of tank 2 is mounted a roll 35 over which threads emerging from the trough pass, rotated by a shaft 36 by bevel gears. The shaft 36 receives its power from a horizontal shaft 37 to which it is connected by suitable gearing. Shaft 37 is driven by worm gear 38 receiving its power from an outside source here shown as a motor 39. The shaft 36 is supported by the brackets of an end upright in the frame 1 and is provided with a series of bevel gears here shown as identical in diameter and having the same number of teeth. Immediately below troughs 2 are tanks 3 and 4 on the same level with one another, trough 3 being relatively short, with respect to trough 4, and containing cold glycerol, that is glycerol at substantially room temperature (70° F.). In trough 4 is heated glycerol, heat being supplied thereto by a steam pipe 40 provided with a gauge and valve 42 for controlling the temperature, supplied with steam from an outside source through steam manifold pipe 43 which is provided with a valve 44 if desired. The pipe 40 passes as a coil into trough 4 and is exhausted through pipe 41. Roller 45 is mounted to dip into the cold glycerol in the trough 3 and rollers 46 and 47 are mounted above the ends respectively of trough 4, out of the glycerol adapted to support an endless conveyor belt 48 rotated by roller 47 with its lower half dipping below the surface of the heated glycerol, its upper half being awash or slightly elevated above the surface of the glycerol. Troughs 5 and 6 are mounted on successively lower levels and contain heated glycerol. Mounted above the respective ends of trough 5 are rollers 49 and 50 supporting conveyor belt 51 positioned in the glycerol as indicated by belt 47. Mounted above the respective ends of trough 6 are rollers 52 and 53 supporting conveyor belt 54 positioned similarly to belt 47. Mounted above the water bath 7 on each end thereof are rollers 55 and 56. Immediately below the water bath 7 is the drying conveyor 8 mounted to rotate on rollers 57 and 58. Immediately below the drying conveyor 8 is the trough 9 for vulcanizing solution in which are driven rollers 59 and 60 immersed in the solution driven by a belt 61 through roller 62. The latter is mounted above the exit end of trough 9 and outside of the vulcanizing solution and over it the threads pass in emerging from this solution. The threads then pass into the trough 10 also containing a vulcanizing solution which is also provided with driven rollers 63 and 64 immersed in the solution. At the exit end of the trough 10 mounted outside of the solution is a roller 65 over which the threads pass in emerging from the trough 10. Rollers 63 and 64 are driven from roller 65. At the exit end of the alcohol bath 10ª is a roller 66, mounted above and without the alcohol bath, over which the threads pass to the drying conveyors 11, 12 and 13, immediately below the troughs 10 and 10ª at the respective ends of which are rollers 67, 68, 69, 70, 71 and 72. The drying conveyors are provided respectively with heating coils 73, 74 and 75. Immediately below drying conveyor 13 are the two heated glycerol troughs 14 and 15, trough 14 being provided at its exit end with a roller 76 removed from the glycerol, and at the exit end of trough 15 is a roller 77 removed from the glycerol. Below the glycerol trough 15 lies the water bath 16 on the entrance end of which is a roller 78. Mounted outside of this water bath at the exit end thereof is another roller 79 which delivers on to the drying conveyor 17 supported by rollers 80 and 81 at either end thereof. A roller 78ª drives the rollers 79 and 80 through a belt. The driving of the rollers and conveyor belts for passing the thread through the apparatus is effected through motor 39 operating on shaft 37 which drives bevel gears on shaft 36 and shafts 82, 83 and 84. The wind-up roll 85, provided with a suitable compensating device to maintain the peripheral speed of the roll constant with varying diameter of the wind-up roll due to winding material thereon, mounted outside of the apparatus is driven direct from motor 39. Shafts 36 and 83 are located parallel and near one another at one end of the frame, being supported by brackets parallel to end uprights of the frame, and shafts 82 and 83 are similarly supported near and parallel to one another on brackets supported on end uprights at the opposite end of the frame 1. On the upright shaft 82 is mounted a series of bevel gears for driving the following rollers: 47, 53, 56, 57, 66, 71 and 76. From roller 66 roller 65 is driven and rollers 63 and 64. Rollers 70, 72, 81 are driven by shaft 84. Rollers 35, 45, 49, 55, 62, 67, 69, 77 and 78 are driven by shaft 36. Rollers 58, 68 and 78ª are driven by shaft 83. In general the bevel gears mounted on the shafts 36, 82, 83, 84 are, for convenience, shown as having approximately the same diameter and provided with substantially the same number of teeth, although the number of teeth and diameter may be varied as desired. By this arrangement the peripheral speeds of the rolls, provided the rolls are of equal diameter, would be approximately the same and the linear travel of the threads or other material throughout the system would be substantially at the same rate. The diameters of the rolls vary however so that while the rolls have the same angular speed there is a gradual acceleration of linear speed, and hence of the speed of the thread, in passing through successive stages of the apparatus. In other words a slight but appreciable tension is maintained on the thread throughout the successive operations in order to keep it lined up properly. In washing and subsequent drying a very little difference in speed for the two operations is necessary, whereas the speed of the thread as coagulated must be appreciably accelerated upon passing into the hot glycerol baths. Similarly in passing the thread from the drying conveyor 8 into the vulcanizing solutions 9 and 10 there is a considerable increase in speed in passing through the solution compared with that of the drying conveyor since the thread swells and becomes weaker requiring such acceleration to move it through the solution. The regulation of the various speeds throughout the apparatus will be dependent on the operating conditions employed. It is a relatively simple matter to increase the speeds of rolls as required by means of plies of fabric.

For heating the hot glycerol trough 6, a coil of piping 86 is arranged in the bottom of this trough and connected to the steam manifold 43. This coil is connected in turn to another coil lying on the bottom of trough 6. This coil exhausts through suitable valve pipe 87. The troughs 9 and 10 are preferably water jacketed for cooling as shown more clearly in Fig. 4 where a diaphragm 88 divides the trough longitudinally and horizontally in an upper and a lower section. Cold water at a desired temperature is introduced through pipe 89, the water jacket being connected by piping to the next lower trough 10 and exhausting through pipe 90. Of course in place of cold water, hot water or steam may be passed through the water jackets of troughs 9 and 10 if heating is required. Pipe 91 connects steam manifold 43 with coil 73 which is connected by pipe 92 with coil 74 which in turn is connected by pipe 93 with coil 75, which exhausts to the outside. At the bottom of trough 14 is a coil 94 connected to steam manifold 43 which coil communicates by piping with another coil 95 in trough 15 which exhausts to the outside. The drying conveyors 8 and 17 are shown unprovided with heating means but such means may be supplied if required.

Figure 6:
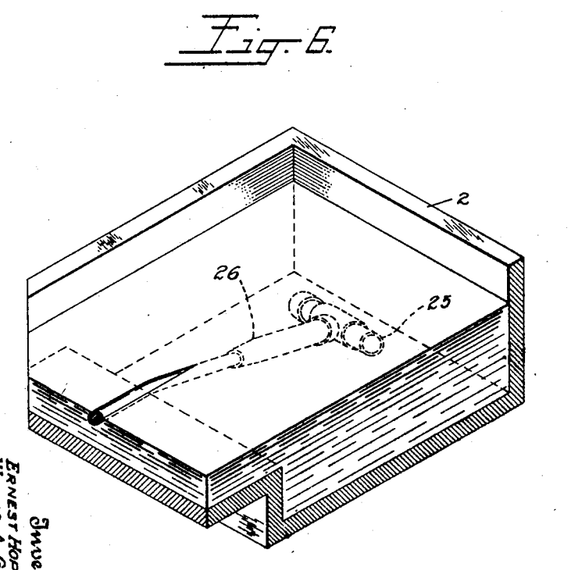
Fig. 6 is a fragmentary perspective partially in section showing a nozzle in position in a coagulant for producing a rubber thread.
Figure 7:
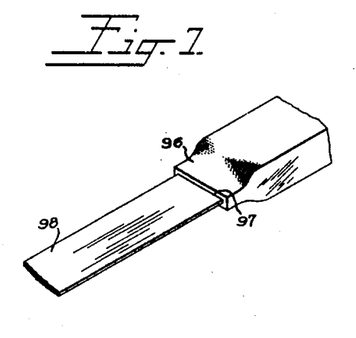
Fig. 7 is a modified form of a nozzle adapted to produce a sheet or strip of rubber.
Figure 8:
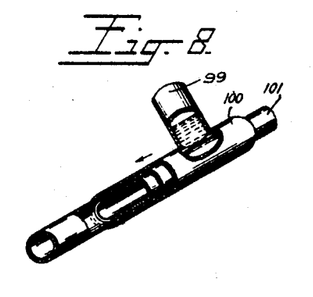
Fig. 8 is another modified form of nozzle for producing tubing.

As shown more clearly in Fig. 6 each of the nozzles 26 has a substantially circular orifice and a stream of latex issuing from this orifice as well as the coagulant resulting is substantially circular. This nozzle may have a variety of forms and in accordance with the shape assumed by the liquid in the process of coagulation the shape of the article may be determined. In Fig. 7 another form of nozzle 96 is shown having a substantially rectangular orifice 97. Latex emerging from this orifice assumes the form of a sheet or strip 98. In Fig. 8 is shown a device for replacing the nozzle 26, capable of forming a tube. This device comprises a T-shaped casing including an upright tube 99 which may be directly joined to the supply pipe 25 and a tube 100 here shown as substantially perpendicular to the tube 99. Concentric with the tube 100 and having a diameter less than the diameter thereof by an amount equal approximately to the wall thickness of the rubber tube desired is a coagulant tube 101 suitably supported with its exit end open and terminating near the open end of the tube 100. Latex passing through tube 99 fills the space between the tubes 100 and 101, the latex being coagulated along its interior surface by acetic acid or other coagulant passing through the tube 101 and along its exterior surface being coagulated by such coagulant as it emerges into the trough 2. The acetic acid or other coagulant passing through the tube 101 serves as a core for the tube. The rate of flow of acetic acid should be governed so that it is approximately the same as that of the latex. A higher rate tends to cause expansion of the coagulated tube. A lower rate tends to cause collapsing.

Figure 9:
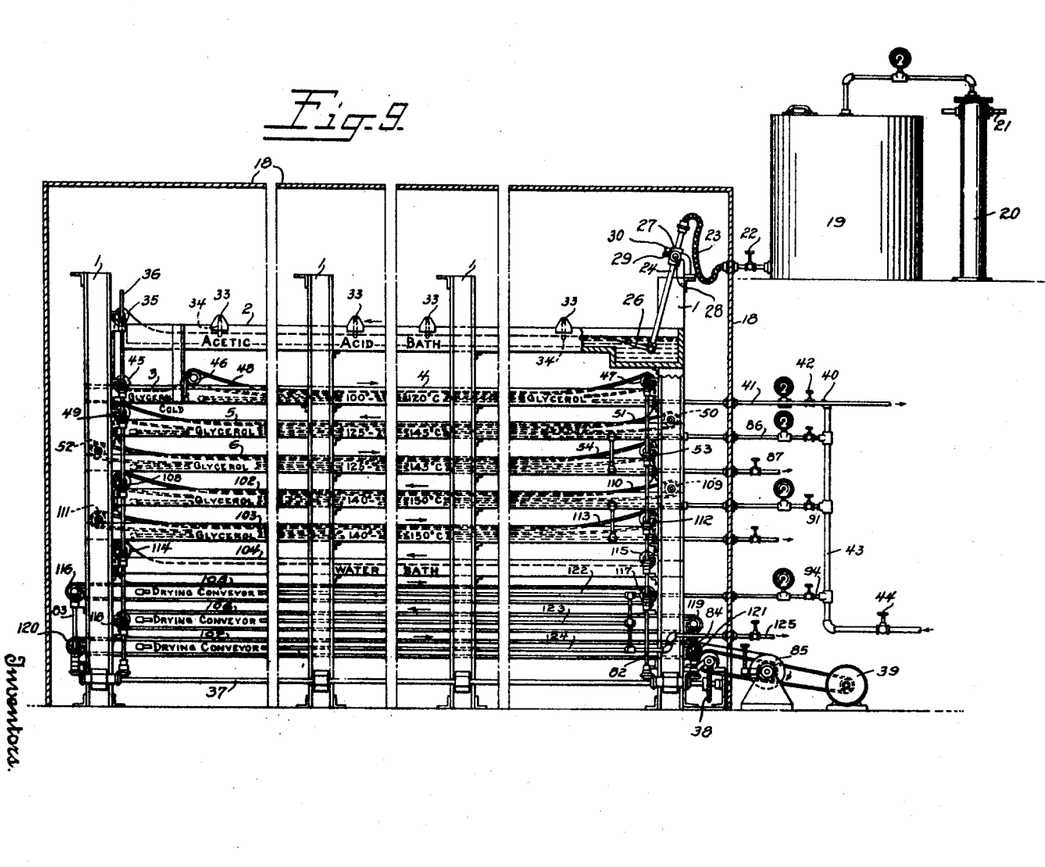
Fig. 9 is a frgamentary side elevation of apparatus similar to that shown in Fig. 1 adapted particularly for production of thread or the like where vulcanizing and other ingredients if desired are combined directly with the latex.

Referring now to the apparatus in Fig. 9 there is shown an assemblage for producing threads from latex with which have been combined vulcanizing ingredients. The apparatus accordingly eliminates the vulcanizing solutions held in troughs 9 and 10 as well as other portions of the apparatus shown in Fig. 1. Comparing the apparatus shown in Fig. 9 with that in Fig. 1 passing from top to bottom of the drawings, the latex supply including the tanks, pressure control means, adjustable nozzles, the acetic acid bath 2, cold glycerol tank 3 and the three superposed heated glycerol tanks 4, 5 and 6 are, as shown in this embodiment, preferably identical. In place however of the water bath 7, drying conveyor 8, vulcanizing solution troughs 9 and 10, and the alcohol bath 10ª, there are substituted two hot glycerol tanks 102, 103, the glycerol therein being heated to 140–150° C., and there is added below the lower glycerol tank a water bath 104 from which the thread passes to three superposed drying conveyors 105, 106, 107 and thence on to the wind-up roll 85, provided with a suitable compensating device to maintain the peripheral speed of the roll constant with increasing size due to winding of the thread or other material thereon. The rollers 46 and 47 and the conveyor belt 48 are identical with the showing in Fig. 1 as well as the rollers 49 and 50, 52 and 53 and the conveyor belts 48, 51 and 54. Shafts 36 and 83 are mounted at one end of the apparatus for driving the rolls and conveyor belts as in Fig. 1 while shafts 82 and 84 are mounted at the opposite end of the apparatus similarly to the showing in Fig. 1. These shafts are driven by means of bevel gears through the horizontal shaft 37 which communicates through worm gear 38 with the motor 39.

The rolls 108 and 109 mounted above respective end of tank 102 support and drive conveyor belt 110 which dips into the hot glycerol in the trough and rollers 11 and 112 mounted above the respective ends of trough 103 support and drive the conveyor belts 113 dipping into the glycerol in tank 103. Mounted above the respective ends of water bath 104 are rolls 114 and 115 of slightly smaller diameter than rolls 111 and 112. These rolls are mounted so that the thread passes under roll 115 into the water bath and then emerges over roll 114 passing thence on to the first drying conveyor 105. This drying conveyor is mounted on rolls 116 and 117 located at either end thereof. Drying conveyor 106 is driven by rolls 118 and 119 located at either end thereof and drying conveyor 107 is driven by rolls 120 and 121 located at either end thereof. The rolls 108, 114, 118 are driven by bevel gears mounted on shaft 36 to coact therewith. Rolls 116, 120 are driven by bevel gears suitably mounted on shaft 83. Rolls 112, 115, 117 are driven by bevel gears suitably mounted on shaft 82 and rolls 119 and 121 are driven by bevel gears suitably mounted on shaft 84. Rolls 109 and 111 receive their motion from rolls 108, 112 respectively through respective conveyor belts 110 and 113. The drying conveyors 105, 106 and 107 are heated by means of coils 122 connected directly with the steam manifold 43, 123 which is connected with coil 122, and 124 which in turn is connected to coil 123, coil 124 connecting with a valved exhaust pipe 125.

Various modifications of the apparatus above described, falling within the scope of the invention, will readily suggest themselves. For example if sufficient floor space is available the troughs in Figs. 1 and 9 instead of being arranged one above the other may be arranged on the same level and in the same line so that thread passing from one pan to another does not drop from a higher to a lower pan but is simply carried along to the adjacent pan or belt on the same level. One advantage of such an arrangement is that ventilation is facilitated. Where a large number of machines is used all the sections using acetic acid by such an arrangement may be housed in the same room. Housing of sets of the other troughs on the same level may also be effected. Instead of the air pressure control device mechanical pressure may be employed in connection with the tank 19 with a suitable control therefor.

Figure 1:
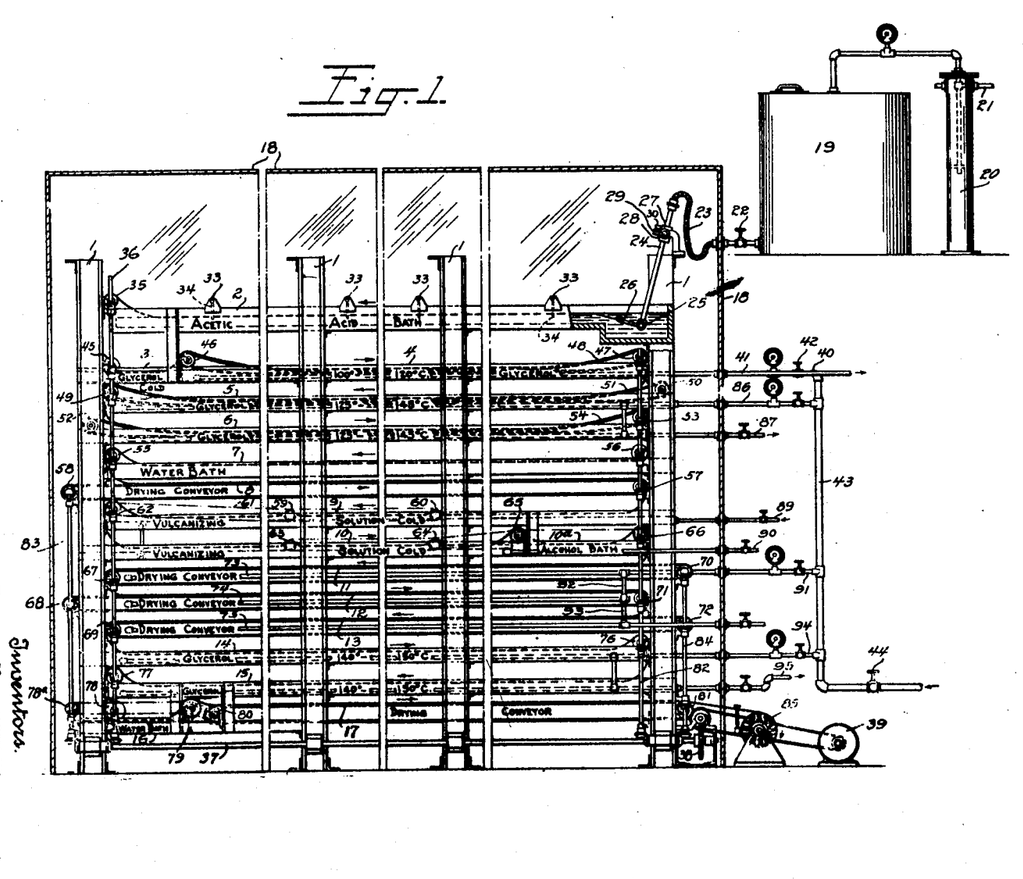
Fig. 1 is a side elevation of the apparatus, portions being removed for convenience, showing the housing in section where a vulcanizing ingredient or ingredients is introduced after formation of the thread or other article.

Although the apparatus here shown is intended for the carrying out of a continuous process, it is not necessary that it be utilized as a whole. Sections of it may be used, for example after coagulation and drying the material may be wound without vulcanization, for example, in Fig. 1. Thus in Fig. 1 a wind-up roll may be placed to receive thread coming off the drying conveyor 8. In place of a large trough for a number of threads as shown in Fig. 3 the trough may be divided longitudinally into a number of sections, one for each thread, doing away if desired with the fingers 34, and in this case the thread may be carried through its trough by causing a flow of the fluid in the trough. The water baths 7 and 16 may be replaced if desired by a stream of water or by water sprays playing on the thread. A similar replacement by a water bath 104 shown in Fig. 9 may be made. In Fig. 1 the drying conveyors 11, 12 and 13 may if desired be replaced by glycerol baths heated to 100–120° C. and the glycerol baths 13 and 14 may be replaced by drying conveyors heated to 140–150° C. for the desired temperature.

In carrying out the process for the manufacture of lengths of thread, and referring to the showing in Fig. 1, latex preferably having a moisture content of 50% or more, preferably approximately 45%, (solid content of 55%) is forced by regulated air pressure from tank 19 through the supply tube to the nozzles 26. The latex is extruded through the circular orifices of these nozzles continuously and as the streams of latex meet the acetic acid or other coagulant in the tank 2 form threads continuous with the streams, containing solid constituents of the latex. Each coagulated thread is continuous with the extruded latex, and at the position where it meets the coagulant the stream is formed into a cohesive rubber mass having approximately the shape of the stream of latex at that position which is approximately that of the orifices in nozzles 26. The shape and size of the thread may be varied by varying the contour and size of the orifice, and by varying the depth of the nozzles below the surface of the acetic acid, by varying the specific gravity of the coagulant, and by altering the rate of withdrawal of material through the orifice. In the preferred method of procedure the orifice for the thread is round and approximately .05 inch in diameter and latex butter having approximately 55% rubber content as noted above is forced into the coagulant, and is withdrawn at the rate of approximately 20 feet per minute by the roller 35 over which the threads pass.

It will be obvious that by varying the shape of the orifice causing it to assume a square or rectangular shape, or that of an oval or other shape, that articles of corresponding shapes may be formed and that by increasing the dimensions of the orifice the dimensions of the article may be correspondingly increased.

The nozzles are preferably held below the surface of the liquid a distance varying from a fraction of an inch to several inches depending particularly on the size of the thread which is issuing. It has been found in practice that it is advantageous to immerse the nozzles to a greater depth as the diameter of the thread is increased.

The preferred coagulant as mentioned above is a 10 to 25% aqueous acetic acid solution. With such a coagulant the issuing thread floats on the surface thereof and passes along through the tank 2 supported by the liquid. By varying the specific gravity of the coagulant however the size of the thread may be varied and it may be caused to sink in the coagulant. For example if alcohol having a low specific gravity is used the issuing thread issues and drops by gravity much more rapidly and produces a smaller thread than where the solution is of the same density approximately as the thread itself. Such a solution may be 10 to 25% acetic acid solution mentioned.

As shown in Fig. 1 the coagulated thread is supported by the liquid and no conveyor is necessary but if desired a conveyor may be used, the upper layer of the conveyor being preferably just awash of the surface of the liquid. A particular advantage of floating the thread on the liquid is that the use of this conveyor is obviated and owing to evenness of pressure on the surface of the thread by floating on the liquid there is little or no flattening or similar effect which might result if a conveyor were used in the early stages of formation of a round thread or thread having other than a flat shape.

The rate of withdrawal of the material from the orifice is important. If it is too slow the material tends to come out in kinks or even in poorly shaped coils. As the rate is increased the thread comes out perfectly straight and smooth. An excessive increase in the rate will tend to decrease the diameter of the thread by drawing it out. Such a decrease in diameter may be profitably employed in some cases where for example it is desired to make thread of varying diameter from the same sized orifice.

At the beginning of the operation the flow of latex is started through the nozzles before submersion in the coagulant so as to prevent the entrance of the liquid into the orifice 2. The latter is then placed in the same position beneath the surface of the coagulating liquid. Coagulation of the issuing drops of liquid immediately occurs, the coagulum commonly adhering to the outside of the tube. There is preferably provided a spring clip 126 or similar device on each nozzle and the small lumps formed on each nozzle upon dipping into the coagulant are grasped by the spring clip and drawn along, the thread attached to the lump following at the desired rate and this thread is then led to the roller 35 over which it passes. The angle made by a plane passing through the longitudinal axes of the nozzles should make an angle considerably less than 90° with the surface of the liquid. The angle should be such that the thread will issue into the liquid and continue moving through it for a short distance at least without any appreciable change in direction in order to prevent distortion or wrinkling.

The thread passing over the roller 35 then passes into the cold glycerol trough 3. A particular purpose of this cold glycerol is to combine, in the cold, glycerol with any acetic acid and water still contained in the thread, rather than to make this combination with the hot glycerol in tank 4, which causes sputtering. The thread passes from this cold glycerol trough into the glycerol trough 4 containing glycerol heated to 100–120° C. This heated glycerol deprives the thread of some of its moisture and acetic acid and since the glycerol is heated above the boiling point of water and acetic acid, these are driven off so that the drying properties of this heated glycerol remain substantially unaltered. The tanks 5 and 6 containing glycerol heated to 125–145° C. remove the final traces of moisture and acetic acid during the passage through the troughs 5 and 6. The thread is supported by conveyors to prevent its deformation. The thread passes into the water bath 7 and there glycerol is removed therefrom thence passing on to a drying conveyor where water absorbed in a water bath is eliminated. From the drying conveyor the thread then passes into vulcanizing solutions contained in the troughs 9 and 10. These troughs hold vulcanizing solutions which consist of 5 parts by weight of zinc butylxanthogenate, 5 parts by weight of dibenzylamine, and 2 parts by weight of sulphur dissolved in 100 parts by weight of benzol containing 20–30% of carbon tetrachloride. Carbon tetrachloride is used to increase the specific gravity of the benzol and to decrease its inflammability. In place of the vulcanizing ingredients mentioned 3 parts by weight of nitrogen sulphide may be used alone dissolved in benzol 65 parts by weight and carbon tetrachloride 35 parts by weight. Or tetramethylthiuramdisulphide 1 part by weight, sulphur 3 parts by weight, zinc oxide 2 parts by weight, and diethylamine 2 parts by weight may be employed in benzol 100 parts by weight, or other solvent. Or 3 parts by weight of zinc dibenzyldithiocarbamate, and 1 part of sulphur by weight dissolved in 78 parts by weight carbon tetrachloride and 22 parts by weight benzol or other solvent may be used. Upon leaving the vulcanizing solution the thread which has been impregnated by the vulcanizing ingredients passes into alcohol contained in the trough 10ª to harden the thread and make it more easily handled. The thread which has been impregnated by the vulcanizing ingredients passes on to the drying conveyors 11, 12 and 13 which are heated approximately to a temperature of 90–230° C. There the alcohol and solvent for the vulcanizing ingredients is driven off and the thread then passes into glycerol baths 14 and 15 heated to 140–150° C. where sufficient vulcanization is given to the thread so that it may be wound up without change of form and stored to complete vulcanization. After leaving the glycerol bath the thread is washed in the water bath 16 to remove water soluble constituents of the latex, and dried on the drying conveyor 17 whence it passes to the wind up roll 85.

Where the vulcanizing ingredients are mixed with the latex in concentrated form, various mixtures may be used. A preferred mixture is as follows: 100 parts rubber as concentrated latex (containing 55% solid content), 1 part tetramethylthiuramdisulphide, 2 parts zinc oxide, 3 parts precipitated sulphur. The preferred method of preparing this mixture consists in mixing the ingredients to be added to the latex with enough concentrated ammonium hydroxide to give a paste and then adding this paste to the latex with stirring. This mixture is placed in the tank 19 shown in Fig. 9 and forced out by air pressure under control of the air pressure regulator 20 through the nozzles 26 in a manner heretofore described. Coagulation occurs in the acetic acid bath. Thread then passes through the cold glycerol bath 3 for a purpose already described, then into heated glycerol baths 4, 5, 6, 102, 103 where vulcanization occurs. The mixture mentioned above will vulcanize in approximately 10 minutes at 150° C. or in about 40 minutes at 100° C. It is obvious that the time for vulcanization will vary in accordance with the vulcanizing ingredients employed. Accordingly if the mixture mentioned is subjected to such temperature for the length of time indicated while passing through the machine substantially complete vulcanization may be effected and vulcanized thread wound up on the winding machine 85. On the other hand if a shorter period of time say twenty minutes is allowed for the passage through the machine at 100° C., vulcanization will be begun during such passage and with the vulcanizing ingredients mentioned will complete itself in approximately two weeks upon standing at ordinary temperature. Where partial vulcanization is perfected it is preferable that sufficient vulcanization be secured so that upon winding up the partially vulcanized thread deformation will not occur.

Various modifications of the process above described may be employed. In place of acetic acid, alchohol alone, may be used of varying strengths. Zinc acetate may be added to acetic acid obviating the necessity of adding zinc in combination elsewhere in the process. Other drying agents than glycerol may be used if desired. The vulcanizing solutions may be heated if preferred and the temperature in general of the various parts of the apparatus may be varied as desired. In place of the alcohol in the alcohol bath 10ª, methyl alcohol, acetone or other material having a similar hardening effect may be employed. The material should preferably be an organic liquid, a non-solvent for rubber, but miscible with the solvents employed in the vulcanizing solutions or baths 9 and 10. The process is preferably carried out continuously but may be carried out in stages if desired.

Instead of employing rubber latex such as that from *Hevea basiliensis* described herein, the juices of similar plants may be employed, for example those producing balata and gutta percha.

As mentioned above various vulcanizing ingredients other than those given in the formula may be added to the latex to secure vulcanization. For example potassium polysulphide may be used alone or to replace sulphur in whole or in part in the above and various other formulæ. In addition the vulcanizing solutions may be replaced by fused sulphur containing high boiling amines such as dibenzylamine and the dithiocarbamates including the zinc dithiocarbamates. The process for the formation of strips may be conducted in substantially the same manner as that described for thread. In the formation of tubes similar processes to those already described may be carried out care being taken that the tubing travels in a straight path until it is sufficiently hardened, so that the danger of collapse of the side walls is avoided.

The processes described for the manufacture of thread, strips, tubing, etc. is simple and decreases the expense and reduces the complication of processes heretofore followed out. By utilizing latex instead of crude rubber the numerous processes necessary for the preparation of this crude rubber including coagulation, washing, drying and, where a compounding ingredient is introduced milling or similar operation, are eliminated. The compounding ingredients including vulcanizing ingredients are more readily introduced into the rubber by the processes herein described than by previous methods, and particularly in the case of the inclusion of vulcanizing ingredients in the latex prior to extrusion a highly homogeneous mixture is obtained resulting in an improved vulcanization.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:

1. A process for making thread, tubing, strips and similar articles which comprises forming from a stream of rubber latex a solid rubber mass continuous with the stream, and recovering the rubber mass.

2. A process for making thread, tubing, strips and similar articles which comprises introducing a stream of rubber latex into a coagulant, forming therefrom a solid rubber mass continuous with the stream, and recovering the rubber.

3. A process for making thread, tubing, strips and similar articles which comprises passing a stream of latex through an opening, and forming an article therefrom of about the contour of the opening.

4. A process for making thread, tubing, strips and similar articles which comprises passing a stream of rubber latex through an opening depriving the latex of moisture, and forming an article therefrom of about the contour of the opening.

5. A process for making thread, tubing, strips and similar articles which comprises continuously passing a stream of latex through a nozzle into a coagulant, coagulating the stream to form a solid rubber mass continuous with the stream, and continuously drying the rubber mass.

6. A process for making thread, tubing, strips and similar articles which comprises continuously passing a stream of latex through an orifice into a coagulant, forming a continuous length of an article of the desired shape, heating and drying the article continuously.

7. A process for making thread, tubing, strips and similar articles which comprises passing a stream of concentrated latex through an opening into a coagulant, forming an article therefrom of about the contour of the opening, and drying the article.

8. A process for making thread, tubing, strips and similar articles which comprises forming from a stream of concentrated rubber latex a solid mass continuous with the stream, and drying and recovering a length of the mass.

9. A process for making thread, tubing, strips and similar articles which comprises passing a stream of rubber latex having a solid content of at least 50% through an opening and forming an article therefrom of about the contour of the opening.

10. A process for making thread, tubing, strips and similar articles comprises passing a stream of latex through an opening of rounded contour, and forming an article therefrom of rounded contour.

11. A process for making thread, tubing, strips and similar articles which comprises passing a stream of latex through a round opening, forming therefrom a solid rounded mass continuous with the stream, and drying the mass.

12. A process for making thread, tubing, strips and similar articles which comprises passing a stream of latex through an opening adapted to form a thread, forming and drying the thread.

13. A process for making thread, tubing, strips and similar articles which comprises passing a stream of rubber latex through an opening adapted to form a thread into a coagulant, forming the thread in the coagulant, and drying the thread.

14. A process for making thread, tubing, strips and similar articles which comprises passing a stream of rubber latex through an opening adapted to form a thread into acetic acid, forming the thread in the acetic acid, and drying the thread.

15. A process for making thread, tubing, strips and similar articles which comprises forming from a stream of latex a solid mass continuous with the stream, passing the mass into a heated drying liquid, and recovering the mass.

16. A process for making thread, tubing, strips and similar articles which comprises passing a stream of latex into a bath of coagulant, forming a cohesive mass continuous with the stream, and having approximately the contour of the stream as it coagulates, and drying the mass by immersing it in a heated liquid.

17. A process for making thread, tubing, strips and similar articles which comprises passing a stream of latex into a bath of coagulant, forming a cohesive mass continuous with the stream, and having approximately the contour of the stream as it coagulates, and drying the mass by immersion in heated glycerol.

18. A process for making thread, tubing, strips and similar articles which comprises passing a stream of latex continuously through an opening into a long bath of acetic acid, coagulating the stream to form a thread continuous with the stream, passing the thread into a bath of heated liquid to remove moisture and acetic acid, and drying the thread.

19. A process for making thread, tubing, strips and similar articles which comprises continuously passing a stream of concentrated latex through an opening into a liquid coagulant, coagulating the stream to form a thread continuous with the stream, passing the thread into a bath of glycerol heated above 100° C., drying and recovering the thread.

20. A process for making thread, tubing, strips and similar articles which comprises continuously passing a stream of latex through a nozzle into a coagulent, coagulating the stream to form a solid rubber mass continuous with the stream, continuously drying the rubber mass, and maintaining the rubber under tension during its passage through the coagulant and its drying.

21. A process for making thread, tubing, strips and similar articles which comprises forming from a stream of rubber latex a solid rubber mass continuous with the stream, recovering the rubber mass, and vulcanizing the mass.

22. A process for making thread, tubing, strips and similar articles which comprises passing a stream of latex through an opening, forming an article therefrom of about the contour of the opening, and vulcanizing the article.

23. A process for making thread, tubing, strips and similar articles which comprises continuously passing a stream of latex through an orifice into a coagulant, forming a continuous length of an article of the desired shape, heating and drying the article continuously, and vulcanizing the article.

24. A process for making thread, tubing, strips and similar articles which comprises forming from a stream of concentrated rubber latex a solid mass continuous with the stream, and drying and vulcanizing the mass.

25. A process for making thread, tubing, strips and similar articles which comprises passing a stream of latex through an opening of rounded contour, forming an article therefrom of rounded contour, and vulcanizing the article.

26. A process for making thread, tubing, strips and similar articles which comprises passing a stream of latex through a round opening, forming therefrom a solid rounded mass continuous with the stream, and drying and vulcanizing the mass.

27. A process for making thread, tubing, strips and similar articles which comprises passing a stream of latex through an opening adapted to form a thread, and forming, drying and vulcanizing the thread.

28. A process for making thread, tubing, strips and similar articles which comprises passing a stream of rubber latex through an opening adapted to form a thread into a coagulant, forming the thread in the coagulant, and drying and vulcanizing the thread.

29. A process for making thread, tubing, strips and similar articles which comprises passing a stream of latex into a bath of coagulant, forming a solid mass continuous with the stream, and having approximately the contour of the stream as it coagulates, drying the mass by immersion in heated glycerol, and vulcanizing the mass.

30. A process for making thread, tubing, strips and similar articles which comprises passing a stream of latex through an orifice into a coagulant, coagulating the stream to form an article continuous therewith, removing the coagulant, drying the article, passing the article through a solution containing a vulcanizing ingredient, and vulcanizing the article.

31. A process for making thread, tubing, strips and similar articles which comprises continuously passing a stream of latex through an orifice into a coagulant, coagulating the stream to form a thread continuous therewith, passing the thread continuously into a solution of vulcanizing ingredients, removing the solution in the thread, and heating the thread to vulcanize it.

32. A process for making thread, tubing, strips and similar articles which comprises continuously passing a stream of latex through an orifice into a coagulant, coagulating the stream to form a thread continuous therewith, passing the thread continuously into a solution containing sulphur, zinc in combination, carbon disulphide and an amine, removing the solvent from the thread, and vulcanizing the thread.

33. A process for making thread, tubing, strips and similar articles which comprises combining with latex a vulcanizing ingredient, forming from a stream of combined latex a solid mass continuous therewith, and recovering and vulcanizing the mass.

34. A process for making thread, tubing, strips and similar articles which comprises combining with latex vulcanizing ingredients adapted to vulcanize the rubber therein, passing a stream of the latex so combined through an orifice into a coagulant, forming an article therefrom having approximately the contour of the orifice, drying the article and heating it to cause the vulcanizing ingredients to vulcanize the article.

35. A process for making thread, tubing, strips and similar articles which comprises combining latex with sulphur, zinc in combination, carbon disulphide and an amine, passing a stream of the latex so combined into a bath of acetic acid, coagulating the stream in the form of a thread, removing acetic acid and moisture from the thread, heating the dried thread to produce vulcanization, and vulcanizing the thread.

36. A process for making thread, tubing, strips and similar articles which comprises passing a stream of concentrated latex having approximately 55% rubber content through an orifice of approximately .05 inch diameter into an acetic acid bath containing 10 to 25% acetic acid, withdrawing the coagulum so formed from the nozzle at the rate of approximately 20 feet per minute, recovering the thread, drying and vulcanizing the thread.

37. A process for making thread, tubing, strips and similar articles which comprises passing a stream of latex from an opening of a desired shape and size into a coagulant having a greater specific gravity than that of the latex, forming an article therefrom of about the contour of the opening continuous with the stream, and pulling the article through the coagulant and thereby permitting the latex to emerge through the opening at a rate to avoid deformation of the article.

38. A process for making thread, tubing, strips and similar articles which comprises passing a stream of concentrated latex through a nozzle for forming a thread beneath the surface of a bath of acetic acid having a higher specific gravity than that of the latex, and withdrawing thread from the latex at the nozzle, forming a thread continuous with the latex, the size of the orifice, its depth of immersion and its rate of withdrawal being such that a thread of the desired contour and size is formed without deformation.

39. A process for making thread, tubing, strips and similar articles which comprises passing a stream of concentrated latex having approximately 55% rubber content through an orifice of approximately .05 inch diameter into an acetic acid bath containing 10 to 25% acetic acid, withdrawing the coagulum so formed from the nozzle at the rate of approximately 20 feet per minute, and recovering the thread so produced.

40. As a new article, latex extruded in a desired shape and dried.

41. As a new article, rubber thread comprising extruded dried latex.

42. As a new article, latex dried in the form of a thread.

43. As a new article rubber thread comprising extruded latex, coagulated and dried.

44. As a new article rubber thread comprising extruded latex, dried and vulcanized.

45. A process for manufacturing articles of any desired length which consists in streaming latex into a coagulant, and coagulating the stream of latex completely to form a solid length of solid constituents of the latex.

Signed at New York, New York, this 11th day of April, 1923.

ERNEST HOPKINSON.

Signed at New York, New York, this 12th day of April, 1923.

WILLIS A. GIBBONS.